US 7,921,418 B2

(12) United States Patent
Nair et al.

(10) Patent No.: US 7,921,418 B2
(45) Date of Patent: Apr. 5, 2011

(54) COMPILE TIME EVALUATION OF LIBRARY FUNCTIONS

(75) Inventors: Rohini Nair, Kerala (IN); Thomas James Christopher Ward, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 1268 days.

(21) Appl. No.: 11/505,070

(22) Filed: Aug. 15, 2006

(65) Prior Publication Data
US 2008/0046870 A1    Feb. 21, 2008

(51) Int. Cl.
*G06F 9/45* (2006.01)
(52) U.S. Cl. ........ 717/151; 717/152; 717/154; 717/136; 717/140; 717/141
(58) Field of Classification Search ............... 717/152
See application file for complete search history.

(56) References Cited

U.S. PATENT DOCUMENTS

| | | | |
|---|---|---|---|
| 5,355,492 A * | 10/1994 | Frankel et al. | 717/151 |
| 6,079,006 A | 6/2000 | Pickett | |
| 6,199,201 B1 | 3/2001 | Lamping et al. | |
| 6,343,375 B1 | 1/2002 | Gupta et al. | |
| 6,487,716 B1 | 11/2002 | Choi et al. | |
| 6,721,943 B2 * | 4/2004 | Krishnaiyer et al. | 717/150 |
| 6,832,369 B1 * | 12/2004 | Kryka et al. | 717/140 |
| 7,089,370 B2 | 8/2006 | Luick | |
| 7,318,223 B2 | 1/2008 | Blainey et al. | |
| 7,331,037 B2 * | 2/2008 | Dickey et al. | 717/106 |
| 7,716,652 B2 * | 5/2010 | Smith et al. | 717/130 |
| 2003/0046671 A1 * | 3/2003 | Bowen | 717/141 |
| 2003/0065888 A1 | 4/2003 | Nishiyama | |
| 2003/0204840 A1 | 10/2003 | Wu | |
| 2004/0098711 A1 | 5/2004 | Song et al. | |
| 2007/0055965 A1 * | 3/2007 | Colyer | 717/143 |
| 2007/0283324 A1 * | 12/2007 | Geisinger | 717/120 |

(Continued)

FOREIGN PATENT DOCUMENTS

JP    2000066896 A    3/2000

OTHER PUBLICATIONS

Office Action (Mail Date May 4, 2010) for U.S. Appl. No. 11/505,148, filed Aug. 15, 2006; Confirmation No. 4552.

(Continued)

*Primary Examiner* — Insun Kang
(74) *Attorney, Agent, or Firm* — Schmeiser, Olsen & Watts; John Pivnichny

(57) ABSTRACT

A method and system for evaluating a call to a library function at compile time. A first call included in a program being compiled by a compiler is identified. The first call is a call to a library function included in a pre-defined list of library functions external to the program. The first call includes one or more arguments associated with one or more formal arguments of a library function in the pre-defined list. The identification of the first call includes searching the pre-defined list of library functions for the library function. The arguments are determined to be constants. A second call to the library function is constructed in an optimizer of the compiler. A result of the second call is statically computed in the optimizer by issuing the second call with the constants as arguments. During compile time, the first call is replaced with the result.

35 Claims, 11 Drawing Sheets

U.S. PATENT DOCUMENTS

2008/0046871 A1  2/2008  Nair
2010/0023932 A1  1/2010  Eichenberger et al.

OTHER PUBLICATIONS

Cahoon, et al.; Recurrence analysis for effective array prefetching in Java; Concurrency and Computation: Practice and Experience; 2003; pp. 1-27.

Liu, et al.; Optimizing Aggregate Array Computations in Loops; ACM Transactions on Programming Languages and Systems; vol. 27, No. 1, Jan. 2005; ACM 0164-0925/05/0100-0091; pp. 91-125.

Cahoon, et al.; Simple and Effective Array Prefetching in Java; JGI'02, Nov. 3-5, 2002, Seattle, Washington, USA; ACM 1-58113-599-8/02/0011; pp. 86-95.

Pugh, et al.; Constraint-Based Array Dependence Analysis; ACM Transactions on Programming Languages and Systems; vol. 20, No. 3, May 1998; ACM 0164-0925/98/0500-0635; pp. 635-678.

Notice of Allowance (Mail Date Aug. 25, 2010) for U.S. Appl. No. 11/505,148, filed Aug. 15, 2006; Confirmation No. 4552.

Cahoon et al.; "Simple and Effective Array Prefetching in Java"; Nov. 2002, pp. 86-95. <http://delivery.acm.org/10.1145/590000/583820/p86-cahoon.pdf>.

Liu et al.; Optimizing Aggregate Array Computations in Loops:; Jan. 2005, pp. 91-125, <http://delivery.acm.org/10.1145/1060000/1053471/p91-liu.pdf>.

Derrien et al.; Combined Instruction and Loop Parallelism in Array Synthesis for FPGAs; Sep. 2001, pp. 165-170, <http://delivery.acm.org/10.1145/510000/500039/p165-derrien.pdf>.

Ogawa et al.; OMPI: Optimizing MPI Programs using Partial Evaluation; Proceedings of the 1996 ACM/IEEE Conference on Supercomputing, Pittsburgh, PA, USA 01-01 Jan. 1996, Piscataway, NY, USA, IEEE, Jan. 1, 1996; 18 pages.

Kleinrubatscher et al.; Fortran Program Specialization; ACM SIGPLAN Notices, vol. 30, No. 4, Apr. 1995; pp. 61-70, XP-002459522.

Samuel Z. Guyer and Calvin Lin; Optimizing the Use of High Performance Software Libraries; Languages and Compilers for Parallel Computing: 13th International Workshop, LCPC 2000, Yorktown Heights, NY, USA, Aug. 10-12, 2000, Lecture Notes In Computer Science, vol. 2017, 2001; pp. 227-243, XP-002459421.

Alt et al.; Cosy Compiler Phase Embedding with the Cosy Compiler Model; Compiler Construction; International Conference, vol. 5th, Apr. 7, 1991; pp. 278-293, XP009082491.

Bacon et al.; Compiler Transformations for High-Performance Computing; ACM Computing Surveys, New York, NY, US, vol. 26, No. 4, Dec. 1994; pp. 345-420, XP002246513.

Bacon, et al.; Fast Static Analysis of C++ Virtual Function Calls; SIGPLAN Notices (ACM Special Interest Group on Programming Languages), vol. 31, No. 10; Oct. 1996; 19 pages.

K.V. Seshu Kumar; Value Reuse Optimization: Reuse of Evaluated Math Library Function Calls Through Compiler Generated Cache; ACM SIGPLAN Notices, vol. 38(8); Aug. 2003; pp. 60-66.

Marino, et al.; Abstract of using static analysis to compile non-sequential functional logic programs; Practical Aspects of Declarative Languages. Second International Workshop, PADL 2000. Proceedings (Lecture Notes in Computer Science vol. 1753), Jan. 2000, Boston, MA, USA: p. 63.

* cited by examiner

COMPILE TIME EVALUATION OF LIBRARY FUNCTIONS

CROSS-REFERENCE TO RELATED INVENTION

This invention is related to U.S. patent application Ser. No. 11/505,148 entitled "ARRAY VALUE SUBSTITUTION AND PROPAGATION WITH LOOP TRANSFORMATIONS THROUGH STATIC ANALYSIS", filed on even date herewith, assigned to the same assignee, and hereby incorporated herein by reference in its entirety.

BACKGROUND OF THE INVENTION

1. Technical Field

The present invention relates to a method and system for evaluating a library function call at compile time, and more particularly to a technique for replacing, at compile time, a library function call whose one or more arguments are constant with the result of the function call.

2. Related Art

Conventionally, the evaluation of a library function call with compile time constant arguments is performed during a program's runtime, as any reference to a preprocessed library is treated in the same manner as a function call. Depending on whether static or dynamic linking is used, the linker or loader ensures that the code to evaluate the library function call is available to the program during runtime. Since the evaluation of the function call waits until program execution, there is overhead from call linkage, parameter loading and unloading, function prologue, function epilogue, and return linkage. Thus, there exists a need to overcome at least one of the aforementioned deficiencies and limitations of the related art.

SUMMARY OF THE INVENTION

In first embodiments, the present invention provides a computer-implemented method of evaluating a call to a library function at compile time, comprising:

identifying a first call included in a program being compiled by a compiler during a compile time of the program, the first call being a call to a library function included in a pre-defined list of library functions, the first call including one or more arguments, the library function including one or more formal arguments associated with the one or more arguments in a one-to-one correspondence, and the identifying including searching the pre-defined list of library functions for the library function, the library functions being external to the program;

determining that the one or more arguments are one or more constant values;

constructing, in an optimizer of the compiler, and responsive to the identifying and the determining, a second call to the library function, the second call including the one or more constant values;

statically computing, in the optimizer, a result of the second call, the result computed by issuing the second call to the library function with the one or more constant values bound to the one or more formal parameters in a one-to-one correspondence; and replacing, during the compile time, the first call included in the program with the result.

In a first aspect, the method further comprises:

parsing, via a parser of the compiler, the program to generate an intermediate representation of the program;

optimizing, in response to the parsing and via the optimizer, the intermediate representation by a plurality of optimization processes to generate optimized code, the plurality of optimization processes comprising one or more initial optimization processes and a final optimization process, wherein the final optimization process includes the identifying, the determining, the constructing, the statically computing and the replacing, and wherein the final optimization process is initiated in response to a completion of the one or more initial optimization processes; and generating machine code, in response to the optimizing and via a code generator of the compiler, the generating including transforming the optimized code into the machine code.

In a second aspect, the method further comprises:

parsing, via a parser of the compiler, the program to generate an intermediate representation of the program;

optimizing, in response to the parsing and via the optimizer, the intermediate representation by a plurality of optimization processes to generate optimized code, the plurality of optimization processes comprising a first set of one or more optimization processes, a data flow optimization process, and a second set of one or more optimization processes, wherein the data flow optimization process includes the identifying, the determining, the constructing, the statically computing and the replacing, wherein the data flow optimization process is initiated in response to a completion of the first set of one or more optimization processes, and wherein the second set of one or more optimization processes are initiated in response to a completion of the data flow optimization process; and generating machine code, in response to the optimizing and via a code generator of the compiler, the generating including transforming the optimized code into the machine code.

In a third aspect of the method, the data flow optimization process further includes at least one of a constant propagation process and a constant folding process.

In a fourth aspect of the method, the identifying comprises:

extracting a plurality of tokens from an intermediate representation of the program;

matching a token of the plurality of tokens with the library function of the pre-defined list, wherein the token indicates a name of the library function included in the first call; and scanning a plurality of characters associated with the token to determine the one or more arguments.

In a fifth aspect of the method, the extracting comprises:

obtaining each character of multiple characters included in the intermediate representation, until a character obtained from the multiple characters indicates an end of the token.

In a sixth aspect of the method, the scanning comprises:

obtaining one or more characters of the plurality of characters until a character of the one or more characters indicates an end of an argument of the one or more arguments or an end of a list of the one or more arguments, the list included in the first call.

In a seventh aspect of the method, the determining comprises:

obtaining a character of the argument;

determining that the argument is a constant value in response to the character being an indication of a single character constant, a string constant, or a numeric constant.

In an eighth aspect of the method, the constructing comprises:

obtaining a pointer to the library function; and placing the pointer in the second call.

In a ninth aspect of the method, the replacing comprises:

positioning a pointer to reference the first call, wherein the first call comprises a plurality of tokens, the plurality of tokens including an initial set of multiple tokens and a final token;

deleting the initial set from the first call; and replacing, responsive to the deleting, the final token with the result.

Advantageously, the present invention provides a technique for evaluating a library function call having compile time constant arguments that decreases execution time of a program, which is particularly attractive when a "compile once, run many times" approach is adopted. Further, the technique disclosed herein facilitates the optimization of larger blocks of code, decreases the size of executables, and more effectively utilizes data and instruction caches. Still further, the present invention can be easily implemented relative to any source language and any architecture.

DETAILED DESCRIPTION OF THE INVENTION

Overview

Figure 1A:
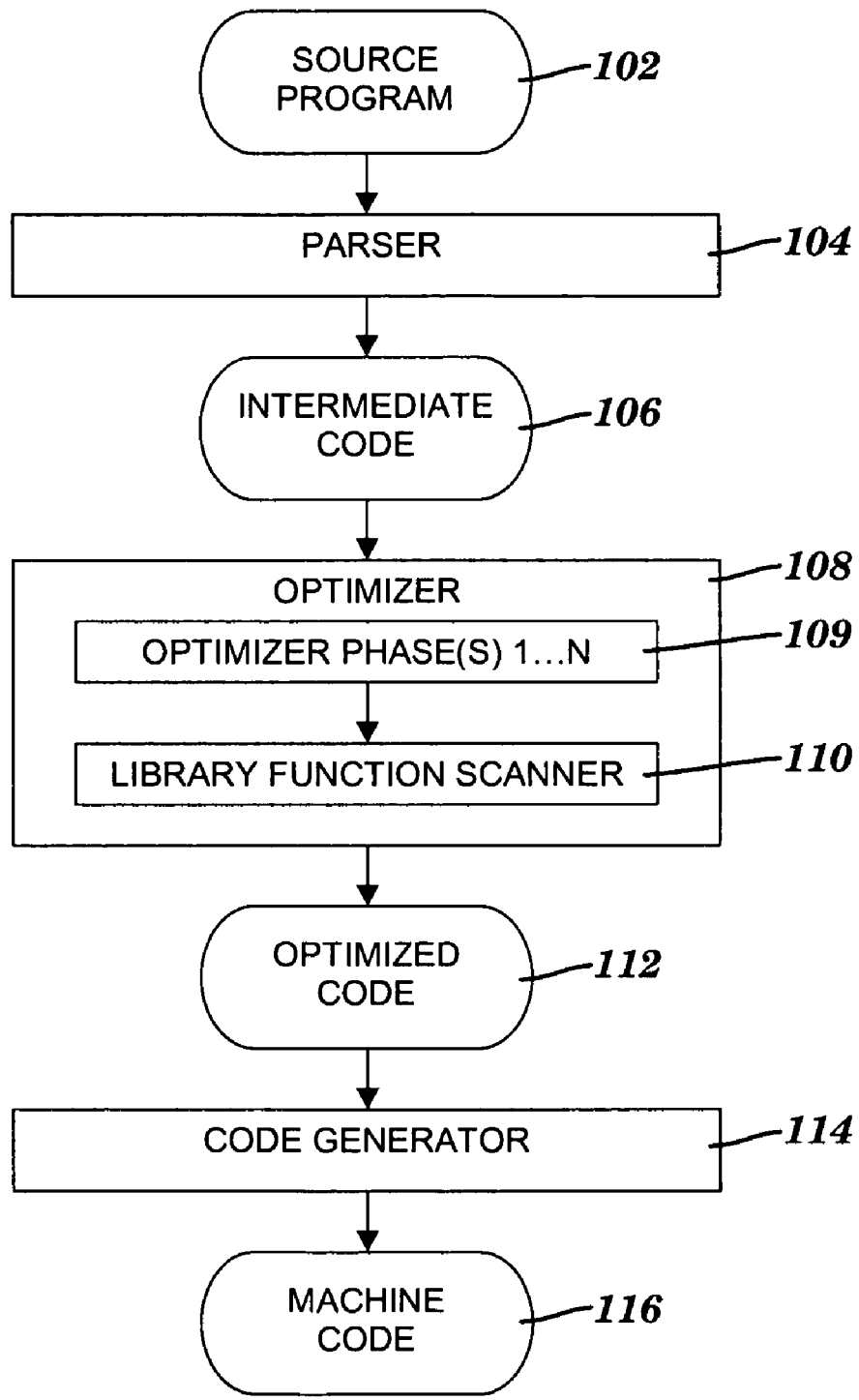
FIG. 1A is a block diagram of a system for evaluating library function calls with compile time constant arguments, where the library function call evaluation is performed in an optimizer of a compiler, in accordance with embodiments of the present invention.

The present invention provides for the static evaluation of library function calls that have compile time constant arguments. An add-on component to a compiler scans an intermediate representation of a program being compiled until a library function call having constants as input arguments is detected. The add-on component constructs a call to the identified library function and statically computes (e.g., in the optimizer of a compiler) the result of utilizing the constant arguments to evaluate the identified function call. The library function call in the intermediate representation is replaced at compile time with the statically computed result. This replacement of library function calls facilitates a decrease in execution time.

For example, consider the following code snippet:

```
int main( )
{
    double a = cos(20);
    ...
}
```

The present invention first detects the cos(20) library function call, and replaces the call with the actual value of cos(20), thereby transforming the code snippet into:

```
int main( )
{
    double a = 0.929692;
    ...
}
```

Definitions

The following terms are used herein and are defined as follows:

Compiler: A computer program that translates a series of statements written in one computer language (e.g., source code) into a resulting output in another computer language (e.g., object, machine or target code).

Compile time: The time period during which a compiler compiles a software program's source code into an executable form (e.g., machine code).

Optimizer: A component of the back end of a compiler. An optimizer applies optimization techniques to intermediate code obtained from a front end of a compiler to enhance the performance and/or reduce the size of the resulting machine code. Examples of optimization techniques include inline expansion, dead code elimination, constant propagation, constant folding, copy propagation, loop transformation, and register allocation.

Data Flow Optimization: A category of optimization techniques that are performed by an optimizer and that are based on data flow analysis. Data flow optimization techniques include, for instance, constant folding, copy propagation, and constant propagation.

Code Generator: A component of a back end of a compiler. A code generator transforms syntactically correct intermediate code or optimized code into an output language (e.g., the native machine code of a computing system).

Parser: A front end of a compiler. A parser performs language translation to convert source code from one language into target code or intermediate code in another language.

Intermediate representation: A functionally equivalent form of source code that is in a different form that facilitates further transformation.

Token: A primitive block of a structured text, such as programming code. Code is comprised of a set of tokens that may be punctuators, string literals, characters, variables, and numbers. Tokens are, for example, separated by a space or a punctuator (e.g., semicolon).

Constant Propagation: An optimization process of substituting values of known constants into expressions at compile time. For example, given code of the form:

a=2 x=a+b constant propagation transforms the second statement into x=2+b (i.e., 2 from the a=2 statement is substituted for a in the x=a+b statement).

Constant Folding: An optimization process of simplifying constant expressions at compile time. For example, if source code includes the expression:

x=12*12+6 then constant folding transforms this expression into:

x=150

Copy Propagation: An optimization process of replacing a variable with its definition. For example, if the definition of variable a is a=b+c, then d=a+f becomes d=b+c+f in response to copy propagation (i.e., the variable a is replaced by the variable a's definition b+c)

Statically compute: To compute during compilation of a software program's source code.

Library function: A subprogram that is included in a collection (i.e., library) of subprograms, and whose code is not part of (i.e., is external to) the source code of a software program being compiled. A library function is distinguished from a user-defined function, which is a subprogram whose code resides in a source program.

Compile Time Evaluation of Library Function Calls

FIG. 1A is a block diagram of a first system 100 for evaluating library function calls with compile time constant arguments, where the library function call evaluation is performed in an optimizer of a compiler, in accordance with embodiments of the present invention. System 100 includes a compiler whose front end and back end components are described below. The compiler operates on a source program 102 (i.e., source code). Source program 102 is received by a parser 104 included in the front end of the compiler. The compiler's front end converts source code 102 into an intermediate representation (a.k.a. intermediate code) 104. Intermediate code 104 is received by an optimizer 108 included in a back end of the compiler. The front end and back end of the compiler may operate as separate passes, or the front end may call the back end as a subroutine.

Optimizer 108 includes components to operate one or more optimizer phases 1 . . . N 109 that facilitate the generation of optimized code, thereby enhancing the performance and/or reducing the size of the machine code resulting from the compilation. One of optimizer phases 109 includes data flow analysis (e.g., constant propagation, constant folding and copy propagation). In a first embodiment illustrated by FIG. 1A, a library function scanner (LFS) 110 is an add-on component to optimizer 108 and operates on the code optimized by optimizer phases 109 to generate optimized intermediate code 112. In the first embodiment, LFS 110 operates on the code being optimized after all N optimizer phases 109 are complete, and prior to the operation of code generator 114.

LFS 110 parses and identifies one or more library function calls. Each LFS-identified library function call (1) includes one or more arguments, each of which is a constant (i.e., static) value, and (2) calls a library function that is included in a pre-defined list of library functions. Each function included in the pre-defined list includes one or more formal parameters. The pre-defined list can include, for example, standard C library functions (e.g., sin (x), cos (x), tan (x), etc.). For each identified library function call, LFS 110 replaces the library function call in the optimized code generated by optimizer phase(s) 1 . . . N 109 with a result. As used herein, the result that replaces a library function call is defined as a value computed by executing the library function called by the identified library function call with the one or more constant arguments of the library function call bound to the one or more formal parameters of the library function. After the replacement of the identified function calls with their respective results, optimized code 112 is generated.

The LFS is an add-on to the optimizer rather than the parser because at the time of parsing, optimizations such as constant propagation would not have been performed and therefore opportunities to locate library function calls having constant arguments would be missed. For example, if during parsing the code being compiled includes:

a=10 b=itoa(a)

where itoa is a library function on the pre-defined list that converts a number into a string, the LFS could not be used because the input argument to itoa is not a constant. In the optimizer, however, constant propagation transforms this sample code into b=itoa(10), a library function call having a constant argument, which presents an opportunity to utilize the LFS.

Optimized code 112 is received by a code generator 114, which is included in the back end of the compiler depicted by system 100. Code generator 114 operates after optimizer 108 generates optimized code 112 via LFS 110, as described above. Code generator 114 transforms optimized code 112 into machine code 116, which can be executed by a computing system.

Figure 1B:
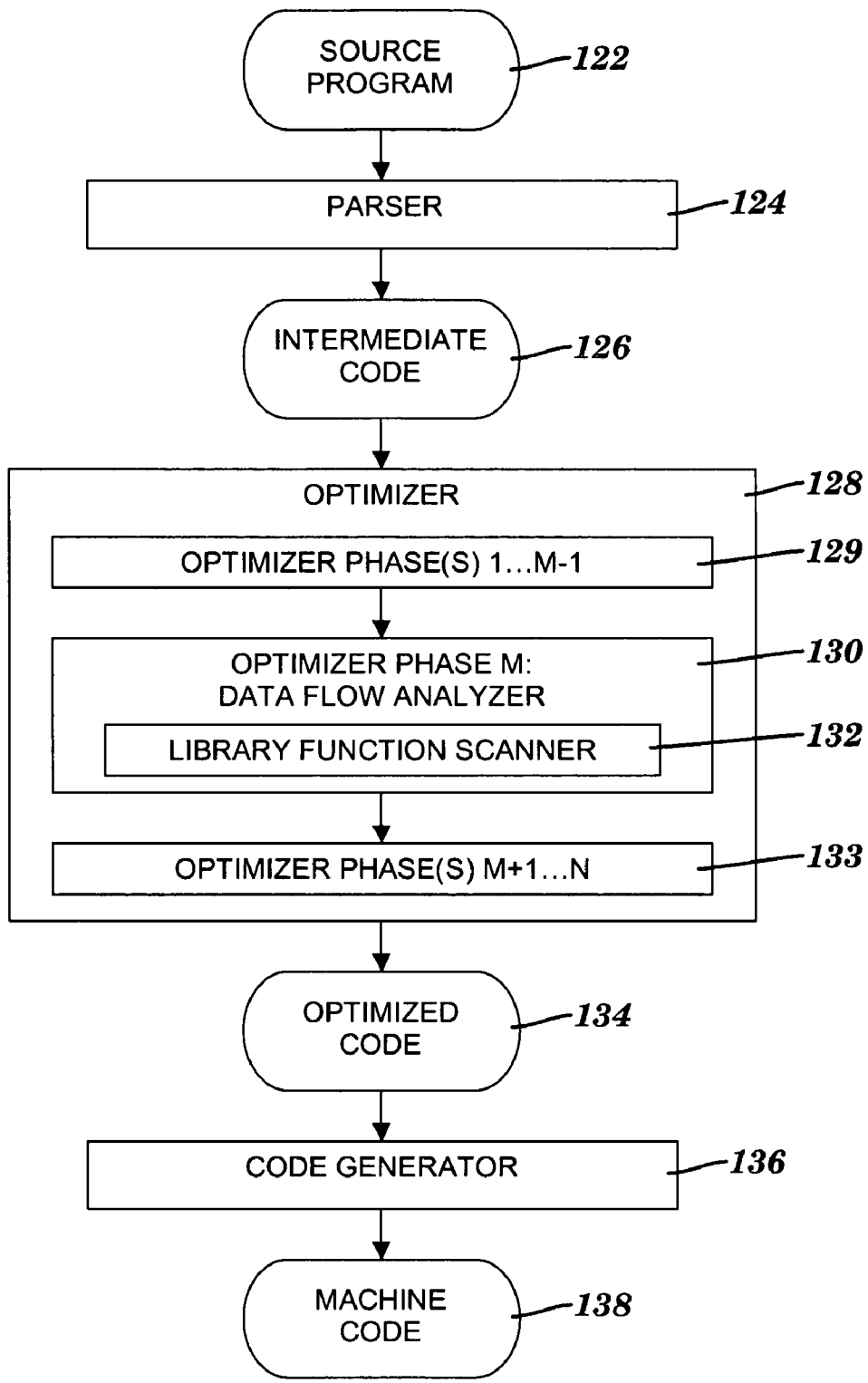
FIG. 1B is a block diagram of a system for evaluating library function calls with compile time constant arguments, where the library function call evaluation is performed in a data flow analyzer of a compiler, in accordance with embodiments of the present invention.

FIG. 1B is a block diagram of a second system 120 for evaluating library function calls with compile time constant arguments, where the library function call evaluation is performed in a data flow analyzer of a compiler, in accordance with embodiments of the present invention. System 120 includes a compiler whose front end is similar to the compiler of FIG. 1A. Source program 122 is received by a parser 124, which converts the source program into intermediate code 126. Intermediate code 126 is received by an optimizer 128, which is included in the back end of the compiler, and which generates optimized code 134. Optimized code 134 is received by a code generator 136 that transforms the optimized code into machine code 138, which can be executed by a computing system.

FIG. 1B illustrates a second embodiment that differs from the first embodiment of FIG. 1A in the components and order of actions performed by optimizer 128. Optimizer 128 includes components to operate one or more optimizer phases 1 . . . M−1 129 that facilitate the generation of a first version of optimized code. A data flow analyzer 130 included in optimizer 128 includes a library function scanner (LFS) 132 as an add-on component. Data flow analyzer 130 receives the first version of optimized code from optimizer phase(s) 129 and performs optimizer phase M, which includes known data flow analysis (e.g., constant propagation and constant folding) followed by novel operations performed by LFS 132 to generate a second version of optimized code (not shown). That is, LFS 132 performs the final phase of the data flow analyzer component of optimizer 128. The second version of optimized code is received by other components of optimizer 128 that perform one or more optimizer phase(s) M+1 . . . N 133 to generate optimized code 134. Like LFS 110 (see FIG.

1A), LFS 132 is included in the optimizer of a compiler, but unlike LFS 110 (see FIG. 1A), LFS 132 does not perform the final optimization of the optimizer. Instead, optimizer phase(s) M=1 . . . N occur subsequent to the optimization of LFS 132.

Similar to the functionality of LFS 110 (see FIG. 1A), LFS 132 identifies library function calls that include constant arguments, and that call library functions included in a pre-defined list of functions. For each identified library function call, LFS 132 computes a result using the constant arguments, and replaces the library function call in the optimized code generated by optimizer phase(s) 129 with the call's result.

Figure 1C:
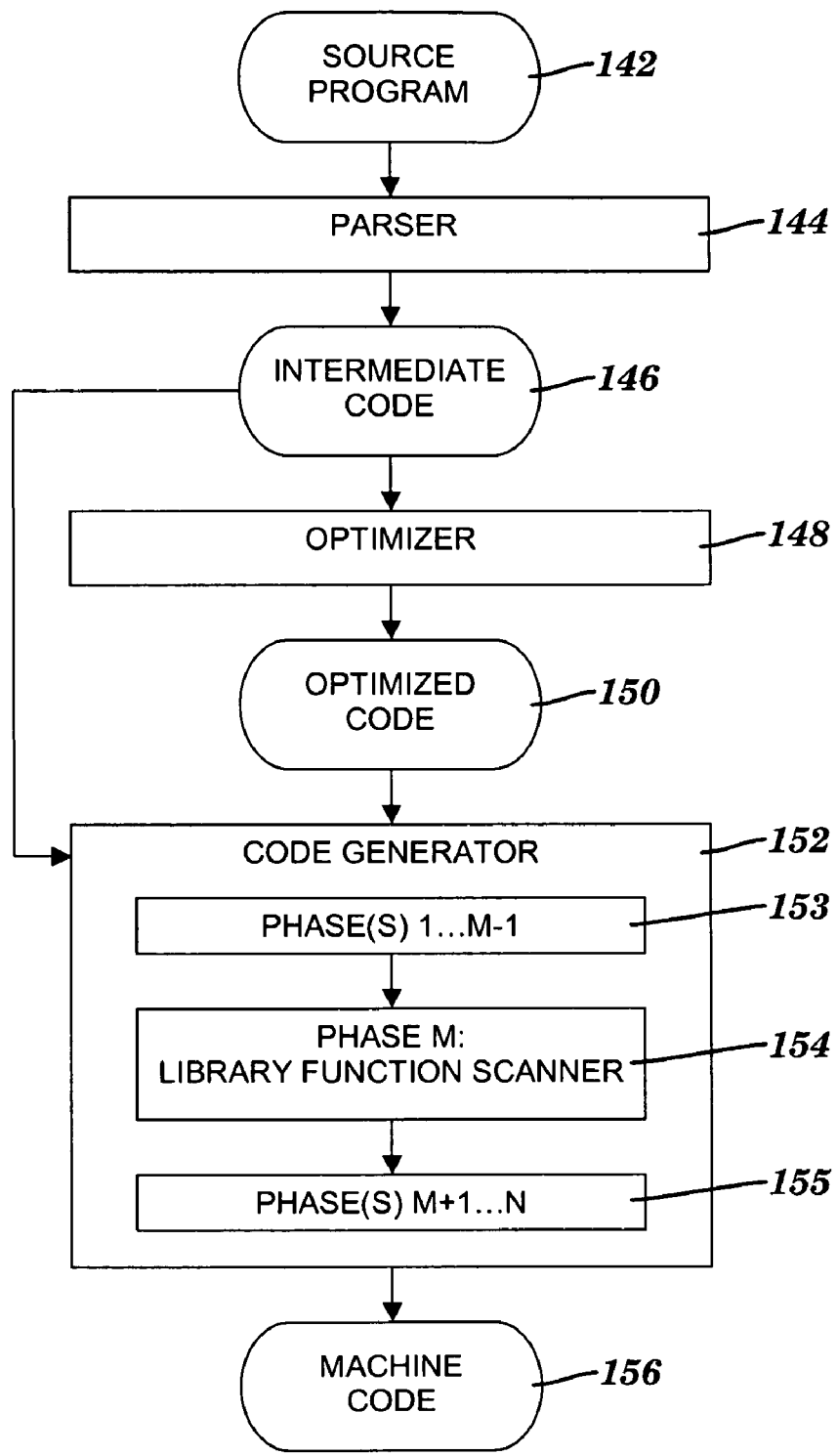
FIG. 1C is a block diagram of a system for evaluating library function calls with compile time constant arguments, where the library function call evaluation is performed in a code generator of a compiler, in accordance with embodiments of the present invention.

FIG. 1C is a block diagram of a third system 140 for evaluating library function calls with compile time constant arguments, where the library function call evaluation is performed in a code generator of a compiler, in accordance with embodiments of the present invention. System 140 includes a compiler whose front end is similar to the compilers of FIGS. 1A and 1B. Source program 142 is received by a parser 144, which converts the source program into intermediate code 146. In a third embodiment depicted by FIG. 1C, intermediate code 146 may be (1) sent to optimizer 148, which does not include a library function scanner, and which generates optimized code 150 that is received by a code generator 152, or (2) sent directly to code generator 152. The specific route taken by intermediate code 146 is user-specified. The functionality of optimizer 148 is equivalent to the functionality of optimizers 108 (see FIG. 1A) and 128 (see FIG. 1B), except that optimizer 148 does not include the functionality of LFS 110 (see FIG. 1A) or LFS 132 (see FIG. 1B).

Code generator 152 includes components that perform one or more phases 1 . . . M−1 153, a library function scanner (LFS) 154 performing an optimization phase M in response to phase(s) 153, and other components that perform one or more phase(s) M+1 . . . N 155. Phase(s) 155 are performed in response to completing the operation of LFS 154. Phases 153, 155 may include the performance of machine code generation and/or code optimization. Following the operation of phase(s) 155, machine code 156 is generated.

LFS 154 includes functionality as described above relative to LFS 110 (see FIG. 1A) and LFS 132 (see FIG. 1B), but unlike FIGS. 1A and 1B, LFS 154 is an add-on component to a code generator (instead of an optimizer), and operates after one or more code generation phases occur.

Figure 2:
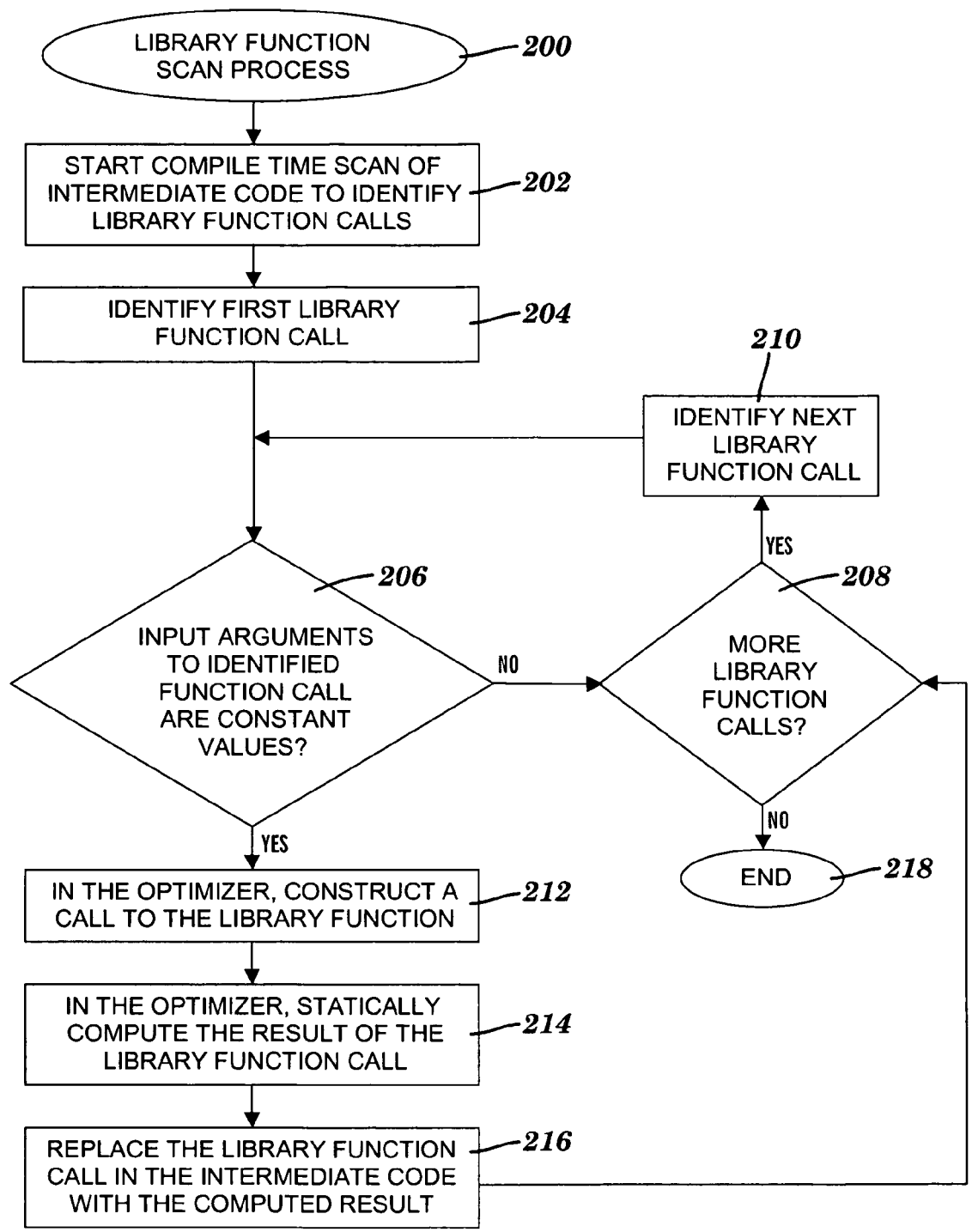
FIG. 2 is a flow chart of a process that implements the evaluation of a library function call with compile time constant arguments for the system of FIG. 1, in accordance with embodiments of the present invention.

FIG. 2 is a flow chart of a process that implements the evaluation of a library function call with compile time constant arguments for the system of FIG. 1, in accordance with embodiments of the present invention. Hereinafter, the process of FIG. 2 is referred to as the library function scan process. The library function scan process begins at step 200 during the compile time of a software program. All steps of FIG. 2 are performed during the compile time of this program. In step 202, the compile time scan of intermediate code is initiated. The intermediate code is an intermediate representation of source code of the program being compiled. The scan identifies function call statements in the intermediate code that call library functions in a pre-defined list of library functions. Source code of the library functions included in the pre-defined list is available to the compiler prior to the start of the library function scan process.

In step 204, the first library function call is identified by the library function scan. Inquiry step 206 determines if all of the one or more input arguments of the identified function call are constant values. If step 206 determines that the one or more input arguments are not all constant values, then step 208 determines if there are more library function calls. If step 208 determines that there are one or more library function calls yet to be identified in the intermediate code, then step 210 identifies the next library function call in the intermediate code, and the process repeats starting at step 206.

Returning to step 206, if the input argument(s) of the identified library function call are all constant values, then the optimizer of the compiler constructs a call to the library function in step 212. In step 214, the optimizer statically computes the result of the library function call constructed in step 212. In one embodiment, steps 212 and 214 are performed by a runtime interface which resides in the LFS and which is described below relative to FIG. 7A. In step 216, the optimizer replaces the library function call in the intermediate code with the result computed in step 214.

Relative to the first embodiment described above (see FIG. 1A), steps 212-216 are performed by an LFS residing in the compiler's optimizer, and are performed in response to the completion of all other optimization phases of the optimizer. Further, relative to the second embodiment described above (see FIG. 1B), steps 212-216 are performed by an LFS residing in the compiler's optimizer, but one or more optimization phases of the optimizer are performed in response the completion of the LFS optimization. Still further, relative to the third embodiment described above (see FIG. 1C), steps 212, 214 and 216 may alternatively be performed by an LFS residing in a code generator of the compiler.

Following step 216, the library function scan process continues with step 208 determining if there are any more library function calls (i.e., library function calls not yet identified by step 204 or step 210). If step 208 determines that there are no additional library function calls, then the library function scan process ends at step 218; otherwise, the process repeats starting at step 210.

In one embodiment, multiple compile time passes of all or part of the FIG. 2 process are utilized to identify library function calls whose arguments are determined to be constants in a current pass, but whose arguments were not determined to be constants in one or more previous passes. This embodiment, for instance, identifies, evaluates and replaces nested library function calls via multiple passes of the process of FIG. 2, starting with the innermost library function call, proceeding in an inner nesting to outer nesting order, and finishing with the outermost library function call. For example, an initial pass of the FIG. 2 process does not identify the outermost library function of cos in the calling statement cos (sqrt(400)) as a library function call having a constant argument. The initial pass, however, does identify the innermost sqrt (i.e., square root) library function call as having a constant argument (i.e., 400), and replaces (in step 216) sqrt (400) with the result (i.e., 20) computed in step 214, thereby transforming the original calling statement into cos(20). A subsequent pass identifies cos(20) as a library function call whose input argument (i.e., 20) is a constant value, and step 216 replaces cos(20) with its statically computed result.

In another embodiment, one or more optimizations from phase(s) 109 (see FIG. 1A) are performed in response to the completion of any of the multiple compile time passes of all or part of the FIG. 2 process, thereby transforming a calling statement such as cos (10+sqrt(400)) into cos (10+20) after a first pass, and then into cos (30) via the application of a non-LFS optimization process. Finally, a subsequent pass of the FIG. 2 process replaces cos (30) with its statically computed result.

Figure 3:
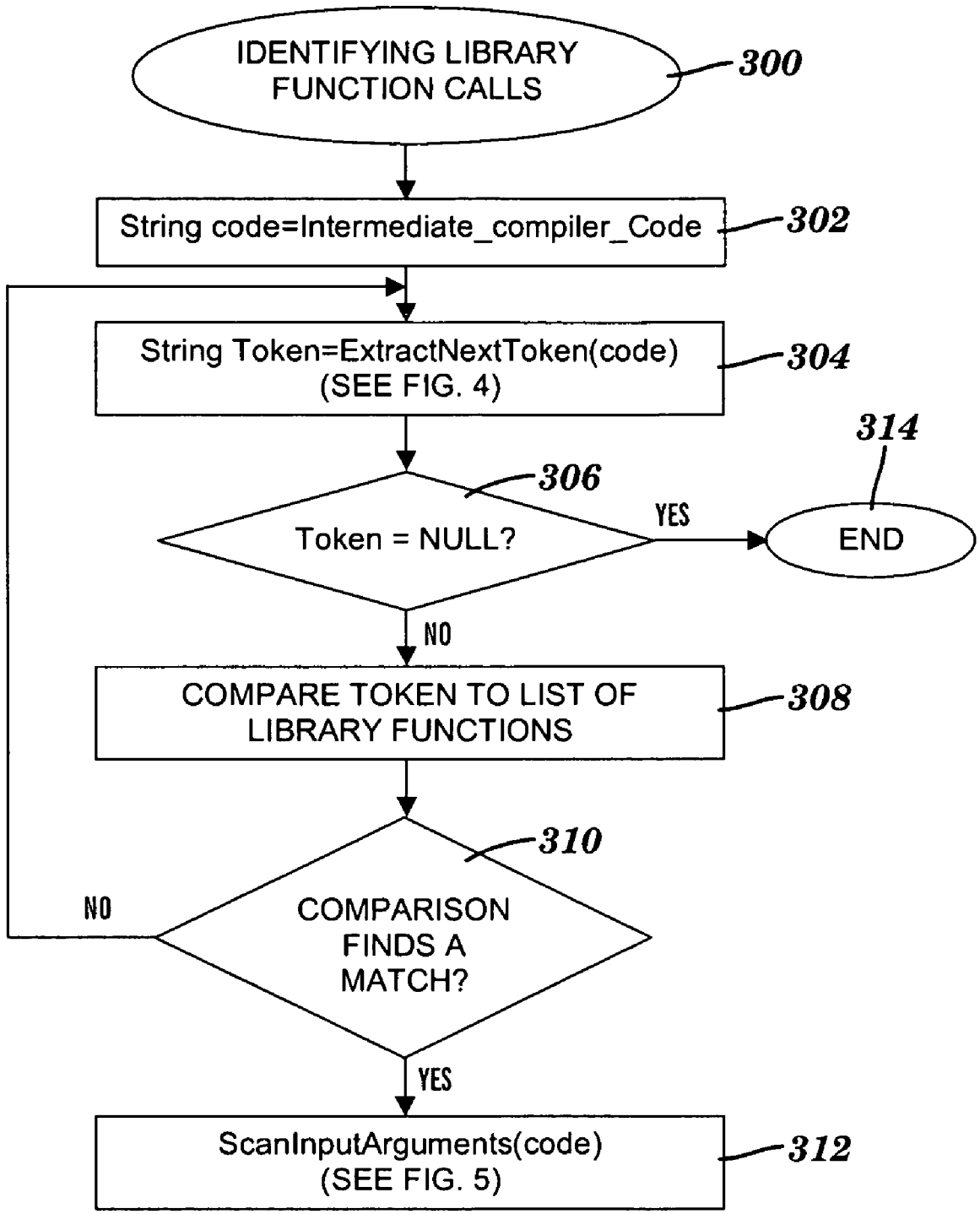
FIG. 3 is a flow chart of a process of identifying a library function call, which is a step in the process of FIG. 2, in accordance with embodiments of the present invention.

FIG. 3 is a flow chart of a process of identifying a library function call, which is included as steps 204 and 210 in the process of FIG. 2, in accordance with embodiments of the present invention. The process of identifying library function calls begins at step 300. In step 302, intermediate code is assigned to a string variable. The intermediate code in step 302 is an intermediate representation (i.e., intermediate code) of source code of a program being compiled by the compiler. In the first embodiment described above relative to FIG. 1A, the intermediate code of step 302 is generated in response to completing the non-LFS optimizations of the optimizer. In the second embodiment described above relative to FIG. 1B, the intermediate code of step 302 is generated in response to completing the non-LFS data flow analysis in the data flow analyzer. In the third embodiment described above relative to FIG. 1C, the intermediate code of step 302 is generated in response to completing phase(s) 1 . . . M−1 of the code generator.

In step 304, the intermediate code is parsed and the next token in the intermediate code is identified and extracted. The details of token extraction are discussed below relative to FIG. 4. If step 306 determines that the extracted token is not null, then step 308 compares the token to the aforementioned pre-defined list of library functions. If inquiry step 310 determines that the step 308 comparison finds a match to one of the functions in the pre-defined list of library functions, then a function call is identified, and step 312 scans the one or more input arguments of the identified function call. The details of scanning the input arguments are discussed below relative to FIG. 5. If no match is determined by inquiry step 310, the process repeats with the extraction of the next token starting at step 304. Returning to inquiry step 306, if the extracted token is null, then the parsing of the intermediate code is complete (i.e., no further tokens remain to be extracted by step 304), and the library function call identification process ends at step 314.

Figure 4:
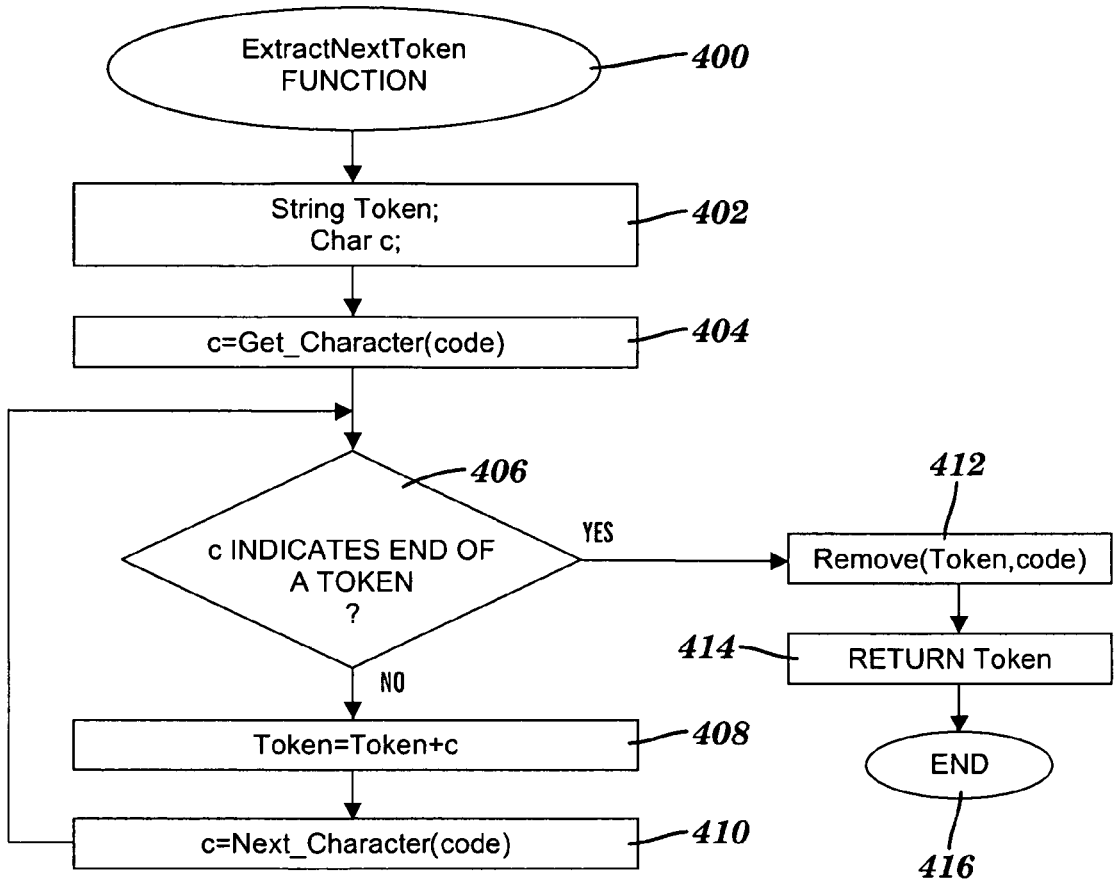
FIG. 4 is a flow chart of a process of extracting the next token in the function call of the process of FIG. 3, in accordance with embodiments of the present invention.

FIG. 4 is a flow chart of a process of extracting the next token in the library function call of the process of FIG. 3 (see step 304 of FIG. 3), in accordance with embodiments of the present invention. The token extraction process begins at step 400. In step 402, the token string and a character variable are defined. In step 404, a character is obtained from the intermediate code defined in step 302 of FIG. 3. Inquiry step 406 determines if the obtained character indicates the end of a token. In one embodiment, characters that each indicate the end of a token include a space, the Enter key, and a semicolon. If a character indicating the end of a token is not determined by step 406, then step 408 concatenates the obtained character to the current token string. Step 410 obtains the next character from the intermediate code, and the process repeats starting at step 406.

Returning to step 406, if the current obtained character is a character indicating the end of a token (i.e., a token is identified), then a function is called in step 412 to remove the identified token from the intermediate code. Step 414 returns the current token string to the calling function in step 304 of FIG. 3, and the token extraction process ends at step 416.

Figure 5:
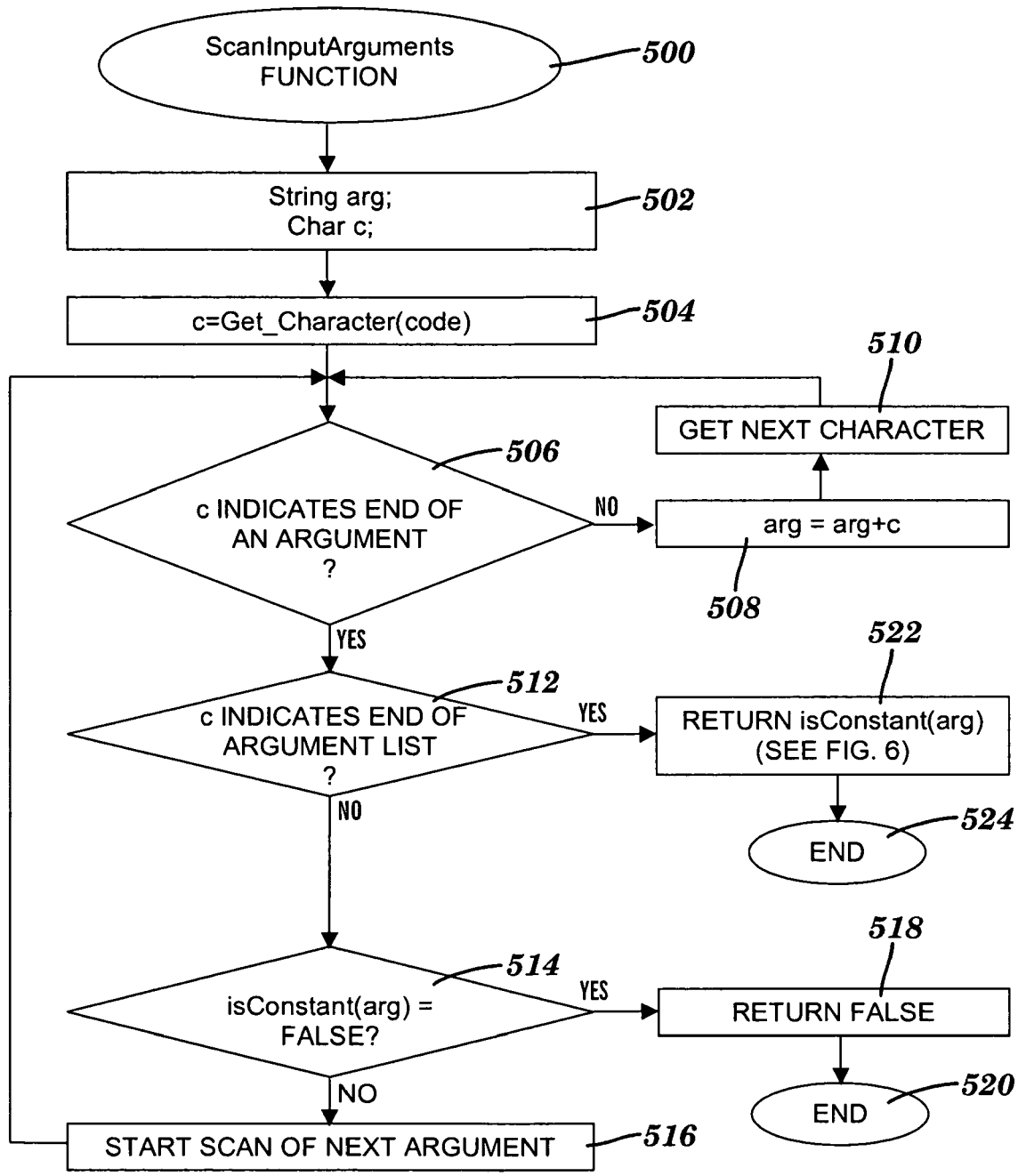
FIG. 5 is a flow chart of a process of scanning one or more input arguments in the function call of the process of FIG. 3, in accordance with embodiments of the present invention.

FIG. 5 is a flow chart of a process of scanning the one or more input arguments in the library function call of the process of FIG. 3 (see step 312 of FIG. 3), in accordance with embodiments of the present invention. The input argument scanning process begins at step 500. In step 502, an argument string and a character variable are defined. In step 504, a character is obtained from the intermediate code defined in step 302 of FIG. 3, and stored in the character variable. The obtained character is associated with a list of one or more input arguments of the library function call identified by the process of FIG. 3.

Inquiry step 506 determines if the character variable indicates the end of an input argument (i.e., the current argument) of the library function call identified by the process of FIG. 3. In one embodiment, characters that indicate the end of an input argument include a comma or a right parenthesis. If step 506 indicates that the current obtained character is not indicating an end of an input argument, then the obtained character is concatenated to the current argument string in step 508. Step 510 obtains the next character in the intermediate code, and the process repeats with the next character as the current obtained character in step 506.

Returning to step 506 following step 504, if the current obtained character indicates the end of an input argument, then the current argument is stored in the argument string of step 502 and step 512 determines if the current obtained character indicates the end of a list of one or more input arguments of the library function call identified by FIG. 3. In one embodiment, the end of a list of input arguments is indicated by a character (e.g., right parenthesis) that follows the final (e.g., rightmost) input argument of the list of input arguments. If step 512 determines that the current obtained character does not indicate the end of a list of input arguments, then step 514 determines if the current argument is a constant (e.g., by calling a function described below relative to FIG. 6). If the current argument is a constant, then the process has found a constant argument, and continues scanning the remaining arguments to check if they are all constants. Step 516 re-initializes the argument string and obtains the next character to initiate a scan of the next argument. Using the next obtained character as the current obtained character, the process repeats starting at step 506.

Returning to step 514, if the current argument is not a constant, then the process has determined that not all of the input arguments are constants. Step 518 returns a value of False to the call in step 312 of FIG. 3. This value of False is then used to determine that the No branch is to be taken from step 206 of FIG. 2. After returning a value of False, the scanning of input arguments ends at step 520.

Returning to step 512, if the current obtained character indicates the end of the list of one or more input arguments, then step 522 determines if the current argument is a constant value (e.g., by calling a function described below relative to FIG. 6). If the current argument is a constant, the process returns True in step 522 to the call of the input argument scan in step 312 of FIG. 3. Alternatively, if the current input argument is not a constant, then the process returns a value of False in step 522 to the call in step 312 of FIG. 3. After the True or False value is returned in step 522, the input argument scan process of FIG. 5 ends at step 524.

Figure 6:
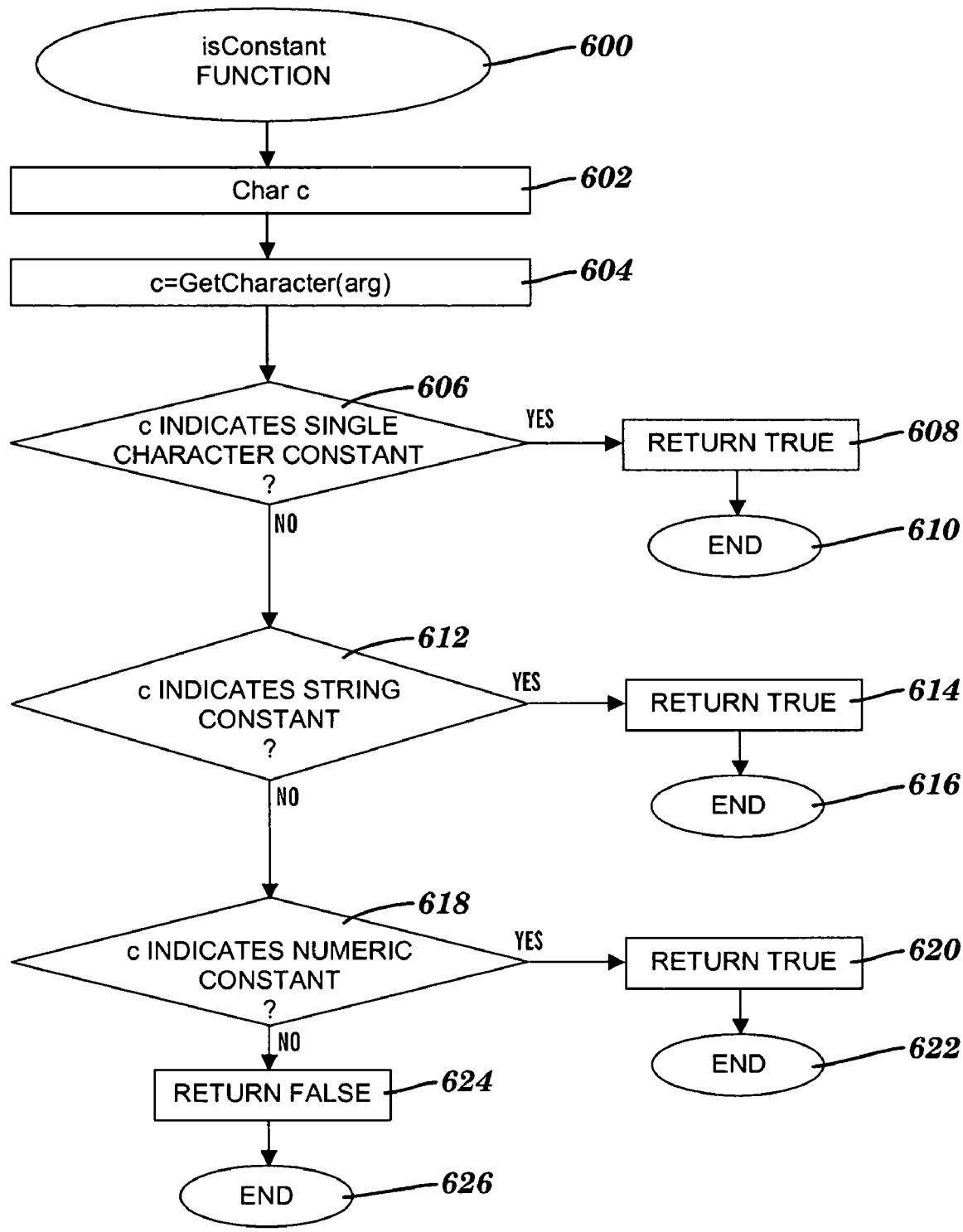
FIG. 6 is a flow chart of a process of determining if an argument scanned in the process of FIG. 5 is a constant, in accordance with embodiments of the present invention.

FIG. 6 is a flow chart of a process (a.k.a. is Constant) of determining if an argument scanned in the process of FIG. 5 is a constant value (see steps 514 and 522 of FIG. 5), in accordance with embodiments of the present invention. The is Constant process starts at step 600. In step 602, a character variable is defined. In step 604, the first character is obtained from the current argument being scanned in FIG. 5. If step 606 determines that the character obtained in step 604 indicates that the argument being scanned is a constant comprising a single character (e.g., the character obtained in step 604 is a single quote), then the is Constant process returns the value of True to the FIG. 5 step that called is Constant, and the is Constant process ends at step 610.

If step 606 determines that the character obtained in step 604 does not indicate a constant comprising a single character, then inquiry step 612 determines if the character indicates that the argument being scanned is a string constant (e.g., the character obtained in step 604 is a double quote). If step 612 determines that the character indicates a string constant, then the is Constant process returns a True value in step 614 and the process ends at step 616.

If step 612 does not determine that the character indicates a string constant, then inquiry step 618 determines if the character indicates that the argument being scanned is a numeric constant. For example, step 618 determines if the character obtained in step 604 is a digit in the set {0 . . . 9} because a variable name cannot start with a numeral. If step 618 determines that the character indicates a numeric constant, then is Constant returns True in step 620, and the process ends at step 622. If, however, step 618 determines that the obtained character is not an indicator of a numeric constant, then is Constant returns False in step 624, and the process ends at step 626.

Figure 7A:
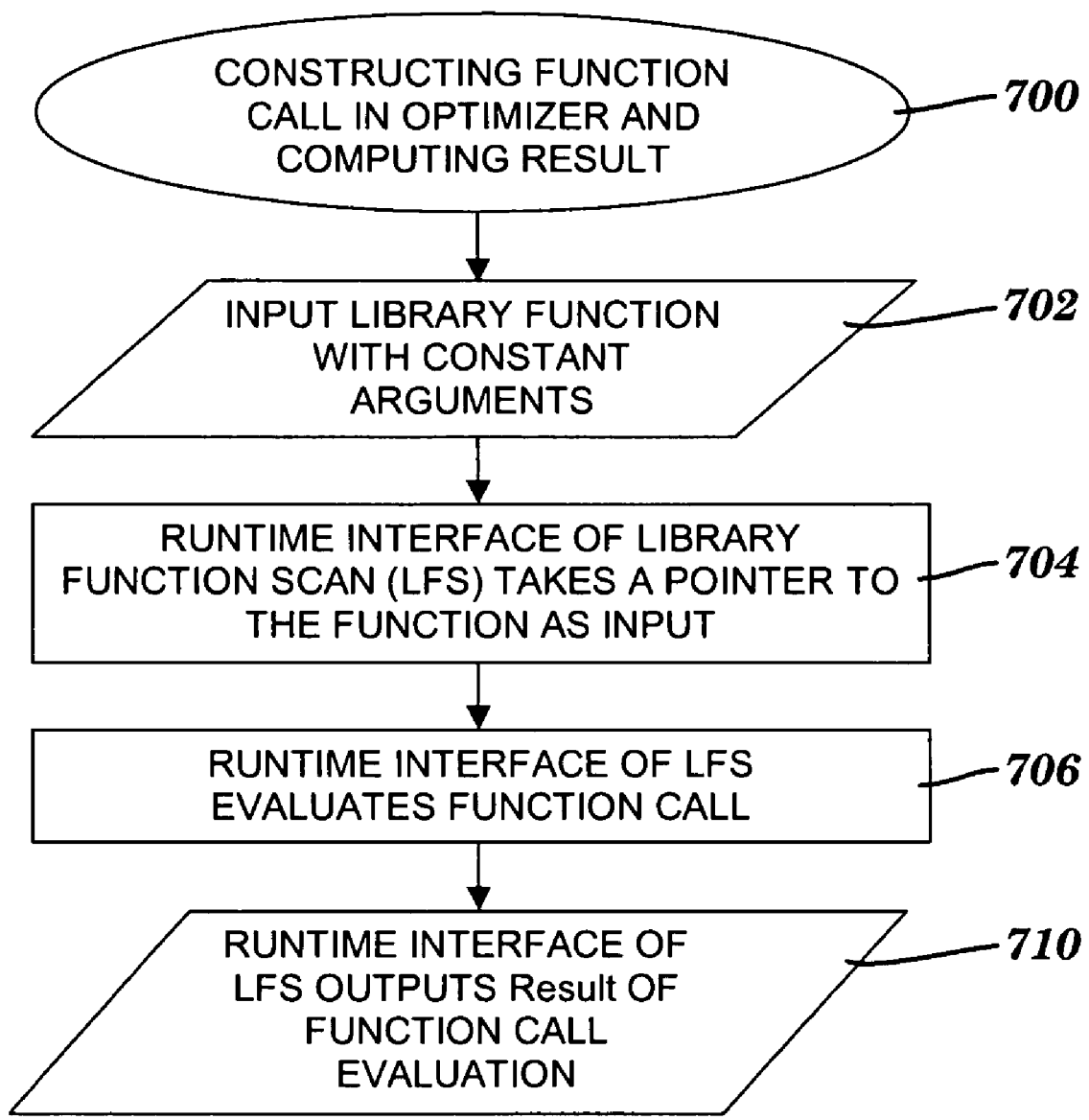
FIG. 7A is a flow chart of a process of constructing the function call of FIG. 2 in an optimizer and computing the result of the call, in accordance with embodiments of the present invention.

FIG. 7A is a flow chart of a process of constructing the library function call of FIG. 2 in an optimizer and computing the result of the call, in accordance with embodiments of the present invention. At step 700, the library function call construction and result computation process begins, and its input 702 includes a library function that is called by a library function calling statement that is identified by step 204 or step 210 of FIG. 2, and whose one or more input arguments are all constant values. In step 704, a runtime interface of the LFS takes, as input, a pointer to the library function called by the identified call. It should be noted that the "runtime" term in the aforementioned "runtime interface of the LFS" refers to the execution time of the compiler that includes the LFS, and not the runtime of the program being compiled. Utilizing the pointer to the library function, the runtime interface constructs a library function call to the library function in step 704. In step 706, the runtime interface of the LFS evaluates the constructed library function call to generate a result. The result of the library function call evaluation is output by the runtime interface in step 710.

As one example, the pre-defined list of library functions is a first array of the form {cos, sin, tan, . . . }, and a second array, fp, is a list of function pointers corresponding to the functions listed in the first array. For instance, the second element of fp (i.e., fp[2]) is a function pointer to the sin function. In this example, given the identified library function call of sin (10), the library function call constructed by the runtime interface of LFS in step 704 is fp[2](10) (i.e., the function pointer corresponding to the library function identified by the scan, together with the same input argument(s) included in the identified library function call).

It should be noted that the example presented above relative to step 704 is only one way to implement the construction of a library function call in a runtime interface of the LFS. The present invention contemplates other implementations of such function call construction.

Figure 7B:
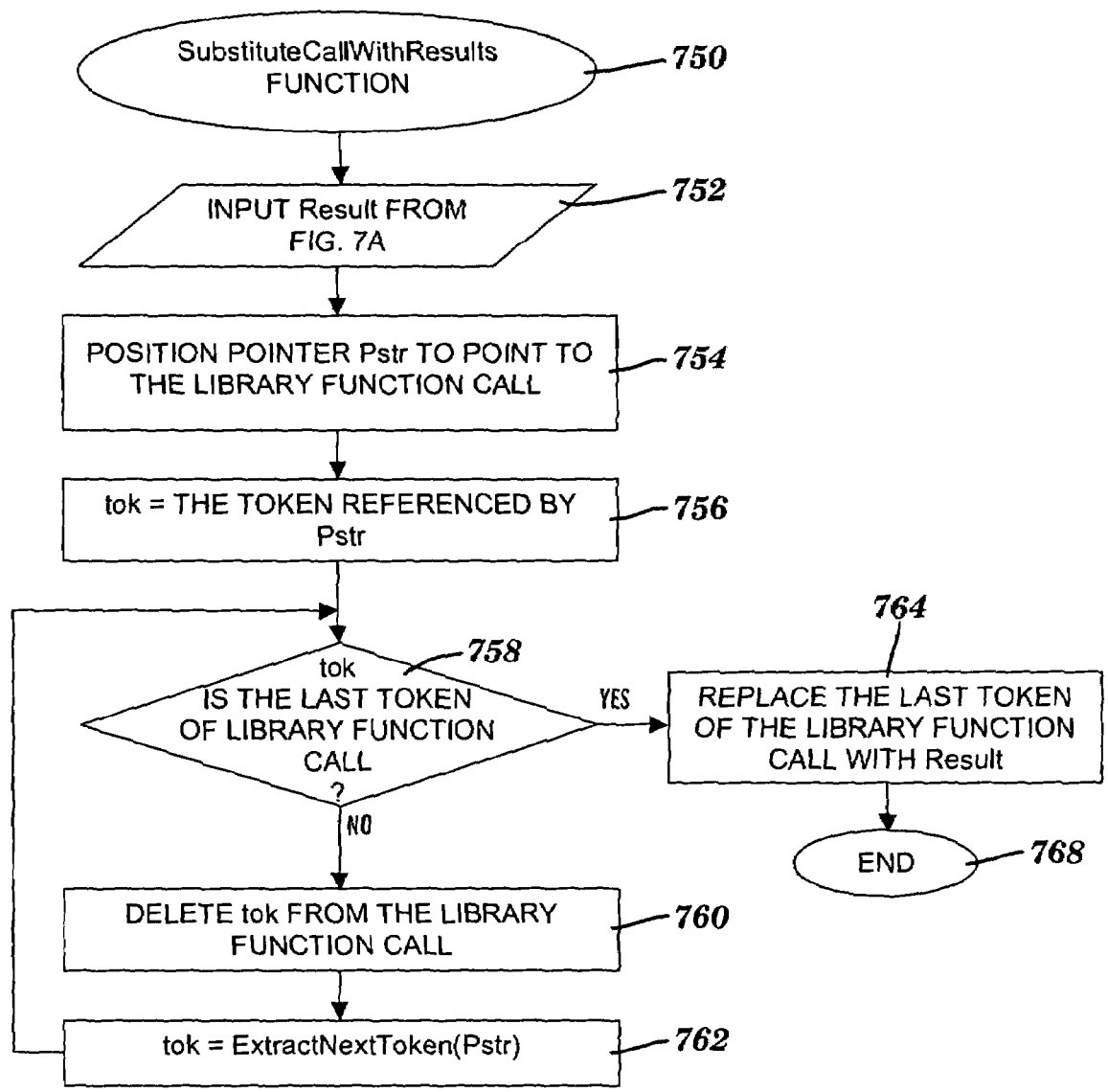
FIG. 7B is a flow chart of a process of substituting the function call of FIG. 2 with the result computed by the process of FIG. 7A, in accordance with embodiments of the present invention.

FIG. 7B is a flow chart of a process of substituting the identified library function call of FIG. 2 with the result computed by the process of FIG. 7A, in accordance with embodiments of the present invention. The substitution process begins at step 750 with input 752 that includes the result computed in the process of FIG. 7A. In step 754, a pointer (hereinafter referred to as Pstr) is positioned to point to the identified library function call in an intermediate representation of the source code being compiled. In step 756, a variable (hereinafter referred to as tok) is assigned the token referenced by Pstr. Inquiry step 758 determines whether tok is an indicator (e.g., a right parenthesis) of the last token in a library function call. If step 758 determines that tok is not an indicator of the last token in a library function call, then step 760 deletes tok from the library function call referenced by Pstr. Step 762 extracts the next token of the library function call referenced by Pstr, and assigns the next token to the variable tok. The process repeats starting at step 758.

Returning to aforementioned determination in step 758, if tok is an indicator of the last token of the library function call, then step 764 replaces the last token of the library function call with the result from step 752. The substitution process ends at step 768.

For example, in an intermediate representation of source code being compiled, the following statement having a call to a string concatenation function is included:

String *str=strcat*("*ab*", "*cd*")

The process of FIG. 2 scans the intermediate representation, identifies strcat as a function on the pre-defined list of library functions, and determines that the strcat function's arguments are constants. The process of FIG. 7A constructs a function call in the runtime interface of the LFS and statically computes the result (i.e., "abcd") of the string concatenation. Finally, the process of FIG. 7B replaces the identified function call in the intermediate representation with the statically computed result. That is, the statement presented above is transformed into:

String *str*="abcd"

As the above example illustrates, the present invention's static evaluation of the strcat function advantageously decreases utilization of data and instruction caches. For instance, the present invention does not require the runtime loading of string constants "ab" and "cd" into registers, nor the storing of the concatenated result of the function call back to memory, thereby avoiding a conventional use of data caches. Further, the present invention does not require the loading of the instructions corresponding to the strcat function call to memory, thereby decreasing instruction cache usage.

Computing System

Figure 8:
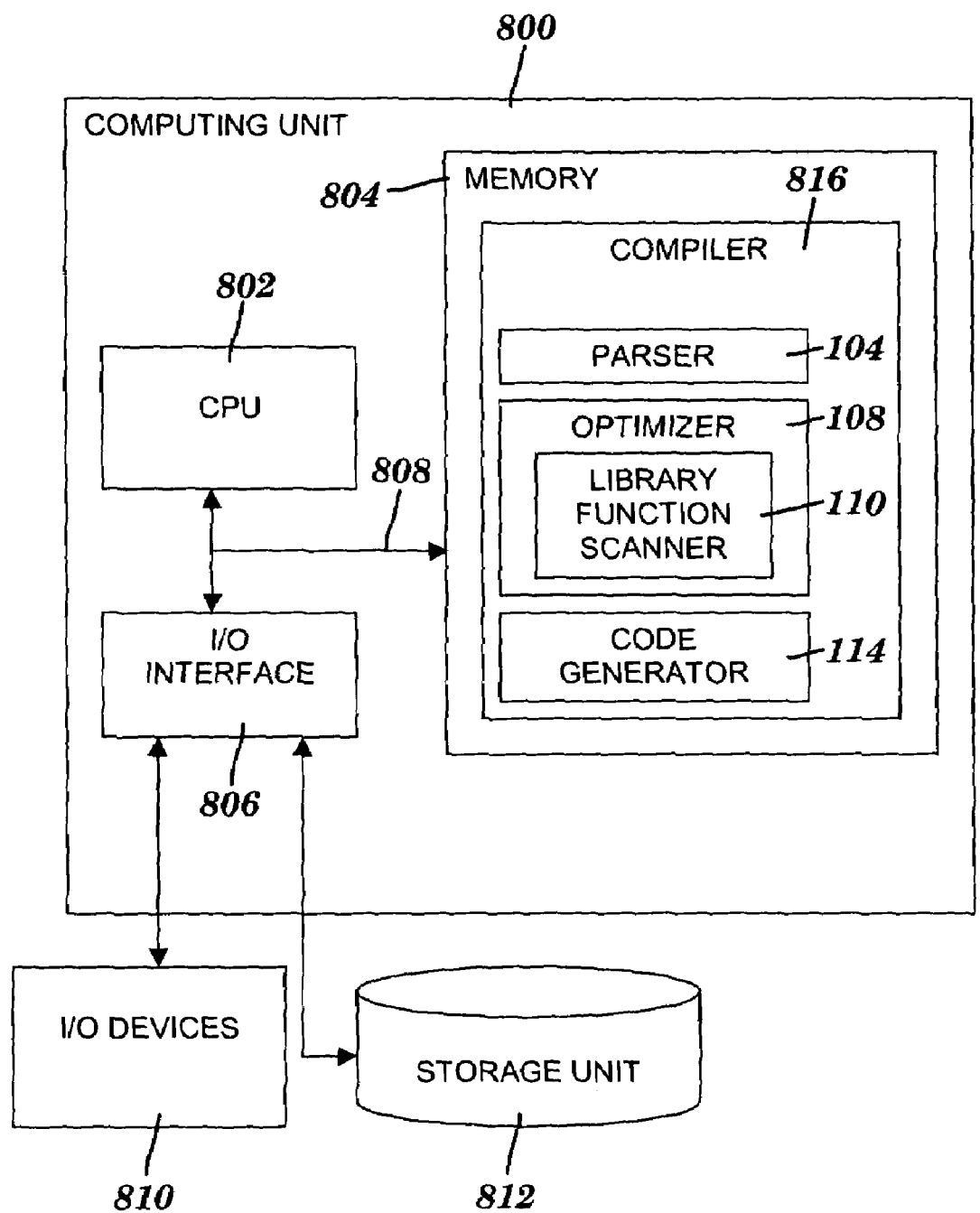
FIG. 8 is a block diagram of a computing system for implementing the process of FIG. 2, in accordance with embodiments of the present invention.

FIG. 8 is a block diagram of a computing unit 800 for implementing the process of FIG. 2, in accordance with embodiments of the present invention. Computing unit 800 generally comprises a central processing unit (CPU) 802, a memory 804, an input/output (I/O) interface 806, a bus 808, I/O devices 810 and a storage unit 812. CPU 802 performs computation and control functions of computing unit 800. CPU 802 may comprise a single processing unit, or be distributed across one or more processing units in one or more locations (e.g., on a client and server).

Memory 804 may comprise any known type of data storage and/or transmission media, including bulk storage, magnetic media, optical media, random access memory (RAM), read-only memory (ROM), a data cache, a data object, etc. Cache memory elements of memory 804 provide temporary storage of at least some program code in order to reduce the number of times code must be retrieved from bulk storage during execution. Storage unit 812 is, for example, a magnetic disk drive or an optical disk drive that stores data. Moreover, similar to CPU 802, memory 804 may reside at a single physical location, comprising one or more types of data storage, or be distributed across a plurality of physical systems in various forms. Further, memory 804 can include data distributed across, for example, a LAN, WAN or storage area network (SAN) (not shown).

I/O interface 806 comprises any system for exchanging information to or from an external source. I/O devices 810 comprise any known type of external device, including a display monitor, keyboard, mouse, printer, speakers, handheld device, printer, facsimile, etc. Bus 808 provides a communication link between each of the components in computing unit 800, and may comprise any type of transmission link, including electrical, optical, wireless, etc.

I/O interface 806 also allows computing unit 800 to store and retrieve information (e.g., program instructions or data) from an auxiliary storage device (e.g., storage unit 812). The auxiliary storage device may be a non-volatile storage device (e.g., a CD-ROM drive which receives a CD-ROM disk). Computing unit 800 can store and retrieve information from other auxiliary storage devices (not shown), which can include a direct access storage device (DASD) (e.g., hard disk or floppy diskette), a magneto-optical disk drive, a tape drive, or a wireless communication device.

Memory 804 includes computer program code comprising compiler 816. Compiler includes parser 104, optimizer 108 and code generator 114. In the first and second embodiments described above relative to FIGS. 1A and 1B, respectively, the optimizer includes LFS 110. Although not shown in FIG. 8, a third embodiment (see FIG. 1C) includes the LFS in code generator 114. The program code of compiler 816 implements the library function scan process of FIG. 2. Further, memory 804 may include other systems not shown in FIG. 8, such as an operating system (e.g., Linux) that runs on CPU 802 and provides control of various components within and/or connected to computing unit 800.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code of compiler 816 for use by or in connection with a computing unit 800 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 804, ROM, a rigid magnetic disk and an optical disk. Current examples of optical disks include compact disk-read-only memory (CD-ROM), compact disk—read/write (CD-R/W) and DVD.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of evaluating a call to a library function at compile time, comprising:
   identifying a first call included in a program being compiled by a compiler during a compile time of said program, said first call being a call to a library function included in a pre-defined list of library functions, said first call including one or more arguments, said library function including one or more formal arguments associated with said one or more arguments in a one-to-one correspondence, and said identifying including searching said pre-defined list of library functions for said library function, said library functions being external to said program;
   determining that said one or more arguments are one or more constant values;
   constructing, in an optimizer of said compiler, and responsive to said identifying and said determining, a second call to said library function, said second call including said one or more constant values;
   statically computing, in said optimizer, a result of said second call, said result computed by issuing said second call to said library function with said one or more constant values bound to said one or more formal parameters in a one-to-one correspondence; and
   replacing, during said compile time, said first call included in said program with said result.

2. The method of claim 1, further comprising:
   parsing, via a parser of said compiler, said program to generate an intermediate representation of said program;
   optimizing, in response to said parsing and via said optimizer, said intermediate representation by a plurality of optimization processes to generate optimized code, said plurality of optimization processes comprising one or more initial optimization processes and a final optimization process, wherein said final optimization process includes said identifying, said determining, said constructing, said statically computing and said replacing, and wherein said final optimization process is initiated in response to a completion of said one or more initial optimization processes; and
   generating machine code, in response to said optimizing and via a code generator of said compiler, said generating including transforming said optimized code into said machine code.

3. The method of claim 1, further comprising:
   parsing, via a parser of said compiler, said program to generate an intermediate representation of said program;
   optimizing, in response to said parsing and via said optimizer, said intermediate representation by a plurality of optimization processes to generate optimized code, said plurality of optimization processes comprising a first set of one or more optimization processes, a data flow optimization process, and a second set of one or more optimization processes, wherein said data flow optimization process includes said identifying, said determining, said constructing, said statically computing and said replacing, wherein said data flow optimization process is initiated in response to a completion of said first set of one or more optimization processes, and wherein said second set of one or more optimization processes are initiated in response to a completion of said data flow optimization process; and
   generating machine code, in response to said optimizing and via a code generator of said compiler, said generating including transforming said optimized code into said machine code.

4. The method of claim 3, wherein said data flow optimization process further includes at least one of a constant propagation process and a constant folding process.

5. The method of claim 1, wherein said identifying comprises:

extracting a plurality of tokens from an intermediate representation of said program;
matching a token of said plurality of tokens with said library function of said pre-defined list, wherein said token indicates a name of said library function included in said first call; and
scanning a plurality of characters associated with said token to determine said one or more arguments.

6. The method of claim 5, wherein said extracting comprises:
obtaining each character of multiple characters included in said intermediate representation, until a character obtained from said multiple characters indicates an end of said token.

7. The method of claim 5, wherein said scanning comprises:
obtaining one or more characters of said plurality of characters until a character of said one or more characters indicates an end of an argument of said one or more arguments or an end of a list of said one or more arguments, said list included in said first call.

8. The method of claim 1, wherein said determining comprises:
obtaining a character of said argument;
determining that said argument is a constant value in response to said character being an indication of a single character constant, a string constant, or a numeric constant.

9. The method of claim 1, wherein said constructing comprises:
obtaining a pointer to said library function; and
placing said pointer in said second call.

10. The method of claim 1, wherein said replacing comprises:
positioning a pointer to reference said first call, wherein said first call comprises a plurality of tokens, said plurality of tokens including an initial set of multiple tokens and a final token;
deleting said initial set from said first call; and
replacing, responsive to said deleting, said final token with said result.

11. A system having a processor for evaluating a call to a library function at compile time, comprising:
means for identifying a first call included in a program being compiled by a compiler during a compile time of said program, said first call being a call to a library function included in a pre-defined list of library functions, said first call including one or more arguments, said library function including one or more formal arguments associated with said one or more arguments in a one-to-one correspondence, and said identifying including searching said pre-defined list of library functions for said library function, said library functions being external to said program;
means for determining that said one or more arguments are one or more constant values;
means for constructing, in an optimizer of said compiler, and responsive to said identifying and said determining, a second call to said library function, said second call including said one or more constant values;
means for statically computing, in said optimizer, a result of said second call, said result computed by issuing said second call to said library function with said one or more constant values bound to said one or more formal parameters in a one-to-one correspondence; and
means for replacing, during said compile time, said first call included in said program with said result.

12. The system of claim 11, further comprising:
means for parsing said program to generate an intermediate representation of said program, said parsing performed via a parser of said compiler;
means for optimizing, in response to said parsing and via said optimizer, said intermediate representation by a plurality of optimization processes to generate optimized code, said plurality of optimization processes comprising one or more initial optimization processes and a final optimization process, wherein said final optimization process includes said identifying, said determining, said constructing, said statically computing and said replacing, and wherein said final optimization process is initiated in response to a completion of said one or more initial optimization processes; and
means for generating machine code in response to said optimizing and via a code generator of said compiler, said generating including transforming said optimized code into said machine code.

13. The system of claim 11, further comprising:
means for parsing, via a parser of said compiler, said program to generate an intermediate representation of said program;
means for optimizing, in response to said parsing and via said optimizer, said intermediate representation by a plurality of optimization processes to generate optimized code, said plurality of optimization processes comprising a first set of one or more optimization processes, a data flow optimization process, and a second set of one or more optimization processes, wherein said data flow optimization process includes said identifying, said determining, said constructing, said statically computing and said replacing, wherein said data flow optimization process is initiated in response to a completion of said first set of one or more optimization processes, and wherein said second set of one or more optimization processes are initiated in response to a completion of said data flow optimization process; and
means for generating machine code, in response to said optimizing and via a code generator of said compiler, said generating including transforming said optimized code into said machine code.

14. The system of claim 13, wherein said data flow optimization process further includes at least one of a constant propagation process and a constant folding process.

15. The system of claim 11, wherein said means for identifying comprises:
means for extracting a plurality of tokens from an intermediate representation of said program;
means for matching a token of said plurality of tokens with said library function of said pre-defined list, wherein said token indicates a name of said library function included in said first call; and
means for scanning a plurality of characters associated with said token to determine said one or more arguments.

16. The system of claim 15, wherein said means for extracting comprises:
means for obtaining each character of multiple characters included in said intermediate representation, until a character obtained from said multiple characters indicates an end of said token.

17. The system of claim 15, wherein said means for scanning comprises:
means for obtaining one or more characters of said plurality of characters until a character of said one or more characters indicates an end of an argument of said one or more arguments or an end of a list of said one or more arguments, said list included in said first call.

18. The system of claim 11, wherein said means for determining comprises:
   means for obtaining a character of said argument;
   means for determining that said argument is a constant value in response to said character being an indication of a single character constant, a string constant, or a numeric constant.

19. The system of claim 11, wherein said means for constructing comprises:
   means for obtaining a pointer to said library function; and
   means for placing said pointer in said second call.

20. The system of claim 11, wherein said means for replacing comprises:
   means for positioning a pointer to reference said first call, wherein said first call comprises a plurality of tokens, said plurality of tokens including an initial set of multiple tokens and a final token;
   means for deleting said initial set from said first call; and
   replacing, responsive to said deleting, said final token with said result.

21. A computer program product comprising a non-transitory computer-usable storage medium including computer-usable program code for evaluating a call to a library function at compile time, the computer program product including:
   computer-usable code for identifying a first call included in a program being compiled by a compiler during a compile time of said program, said first call being a call to a library function included in a pre-defined list of library functions, said first call including one or more arguments, said library function including one or more formal arguments associated with said one or more arguments in a one-to-one correspondence, and said identifying including searching said pre-defined list of library functions for said library function, said library functions being external to said program;
   computer-usable code for determining that said one or more arguments are one or more constant values;
   computer-usable code for constructing, in an optimizer of said compiler, and responsive to said identifying and said determining, a second call to said library function, said second call including said one or more constant values;
   computer-usable code for statically computing, in said optimizer, a result of said second call, said result computed by issuing said second call to said library function with said one or more constant values bound to said one or more formal parameters in a one-to-one correspondence; and
   computer-usable code for replacing, during said compile time, said first call included in said program with said result.

22. The program product of claim 21, further comprising:
   computer-usable code for parsing, via a parser of said compiler, said program to generate an intermediate representation of said program;
   computer-usable code for optimizing, in response to said parsing and via said optimizer, said intermediate representation by a plurality of optimization processes to generate optimized code, said plurality of optimization processes comprising one or more initial optimization processes and a final optimization process, wherein said final optimization process includes said identifying, said determining, said constructing, said statically computing and said replacing, and wherein said final optimization process is initiated in response to a completion of said one or more initial optimization processes; and
   computer-usable code for generating machine code, in response to said optimizing and via a code generator of said compiler, said generating including transforming said optimized code into said machine code.

23. The program product of claim 21, further comprising:
   computer-usable code for parsing, via a parser of said compiler, said program to generate an intermediate representation of said program;
   computer-usable code for optimizing, in response to said parsing and via said optimizer, said intermediate representation by a plurality of optimization processes to generate optimized code, said plurality of optimization processes comprising a first set of one or more optimization processes, a data flow optimization process, and a second set of one or more optimization processes, wherein said data flow optimization process includes said identifying, said determining, said constructing, said statically computing and said replacing, wherein said data flow optimization process is initiated in response to a completion of said first set of one or more optimization processes, and wherein said second set of one or more optimization processes are initiated in response to a completion of said data flow optimization process; and
   computer-usable code for generating machine code, in response to said optimizing and via a code generator of said compiler, said generating including transforming said optimized code into said machine code.

24. The program product of claim 23, wherein said data flow optimization process further includes at least one of a constant propagation process and a constant folding process.

25. The program product of claim 21, wherein said computer-usable code for identifying comprises:
   computer-usable code for extracting a plurality of tokens from an intermediate representation of said program;
   computer-usable code for matching a token of said plurality of tokens with said library function of said pre-defined list, wherein said token indicates a name of said library function included in said first call; and
   computer-usable code for scanning a plurality of characters associated with said token to determine said one or more arguments.

26. The program product of claim 25, wherein said computer-usable code for extracting comprises:
   computer-usable code for obtaining each character of multiple characters included in said intermediate representation, until a character obtained from said multiple characters indicates an end of said token.

27. The program product of claim 25, wherein said computer-usable code for scanning comprises:
   computer-usable code for obtaining one or more characters of said plurality of characters until a character of said one or more characters indicates an end of an argument of said one or more arguments or an end of a list of said one or more arguments, said list included in said first call.

28. The program product of claim 21, wherein said computer-usable code for determining comprises:
   computer-usable code for obtaining a character of said argument;
   computer-usable code for determining that said argument is a constant value in response to said character being an indication of a single character constant, a string constant, or a numeric constant.

29. The program product of claim 21, wherein said computer-usable code for constructing comprises:
- computer-usable code for obtaining a pointer to said library function; and
- computer-usable code for placing said pointer in said second call.

30. The program product of claim 21, wherein said computer-usable code for replacing comprises:
- computer-usable code for positioning a pointer to reference said first call, wherein said first call comprises a plurality of tokens, said plurality of tokens including an initial set of multiple tokens and a final token;
- computer-usable code for deleting said initial set from said first call; and
- computer-usable code for replacing, responsive to said deleting, said final token with said result.

31. A method for deploying computing infrastructure, the method comprising integrating computer-readable code into a computing system, wherein the code in combination with the computing system is capable of performing a process of evaluating a call to a library function at compile time, said process comprising:
- identifying a first call included in a program being compiled by a compiler during a compile time of said program, said first call being a call to a library function included in a pre-defined list of library functions, said first call including one or more arguments, said library function including one or more formal arguments associated with said one or more arguments in a one-to-one correspondence, and said identifying including searching said pre-defined list of library functions for said library function, said library functions being external to said program;
- determining that said one or more arguments are one or more constant values;
- constructing, in a code generator of said compiler, and responsive to said identifying and said determining, a second call to said library function, said second call including said one or more constant values, wherein said code generator transforms an optimized intermediate representation of said program into machine code;
- statically computing, in said code generator, a result of said second call, said result computed by issuing said second call to said library function with said one or more constant values bound to said one or more formal parameters in a one-to-one correspondence; and
- replacing, during said compile time, said first call included in said program with said result.

32. A computer-implemented method of evaluating a call to a library function at compile time, comprising:
- identifying a first call included in a program being compiled by a compiler during a compile time of said program, said first call being a call to a library function included in a pre-defined list of library functions, said first call including one or more arguments, said library function including one or more formal arguments associated with said one or more arguments in a one-to-one correspondence, and said identifying including searching said pre-defined list of library functions for said library function, said library functions being external to said program;
- determining that said one or more arguments are one or more constant values;
- constructing, in a code generator of said compiler, and responsive to said identifying and said determining, a second call to said library function, said second call including said one or more constant values, wherein said code generator transforms an optimized intermediate representation of said program into machine code;
- statically computing, in said code generator, a result of said second call, said result computed by issuing said second call to said library function with said one or more constant values bound to said one or more formal parameters in a one-to-one correspondence; and
- replacing, during said compile time, said first call included in said program with said result.

33. The method of claim 32, further comprising:
- parsing, via a parser of said compiler, said program to generate an intermediate representation of said program;
- optimizing, in response to said parsing and via said optimizer, said intermediate representation by a plurality of optimization processes to generate said optimized intermediate representation; and
- generating machine code from said optimized intermediate representation, in response to said optimizing and via said code generator, said generating comprising:
  - performing a first set of one or more code generation processes;
  - performing a library function scan process; and
  - performing a second set of one or more code generation processes,
  - wherein said performing said library function scan process includes said identifying, said determining, said constructing, said statically computing and said replacing,
  - wherein said performing said library function scan process is initiated in response to a completion of said performing said first set of one or more code generation processes, and
  - wherein said performing said second set of one or more code generation processes is initiated in response to a completion of said performing said library function scan process.

34. The method of claim 32, wherein said identifying comprises:
- extracting a plurality of tokens from an intermediate representation of said program;
- matching a token of said plurality of tokens with said library function of said pre-defined list, wherein said token indicates a name of said library function included in said first call; and
- scanning a plurality of characters associated with said token to determine said one or more arguments.

35. The method of claim 32, wherein said replacing comprises:
- positioning a pointer to reference said first call, wherein said first call comprises a plurality of tokens, said plurality of tokens including an initial set of multiple tokens and a final token;
- deleting said initial set from said first call; and
- replacing, responsive to said deleting, said final token with said result.

* * * * *